(12) United States Patent
Ogawa et al.

(10) Patent No.: US 12,551,120 B2
(45) Date of Patent: Feb. 17, 2026

(54) BLOOD PRESSURE MEASUREMENT DEVICE AND BLOOD PRESSURE MEASUREMENT METHOD

(71) Applicant: OMRON HEALTHCARE Co., Ltd., Kyoto (JP)

(72) Inventors: Hiroshi Ogawa, Kyoto (JP); Miyuki Kimura, Kyoto (JP); Hironori Sato, Kyoto (JP); Atsunori Iwamoto, Kyoto (JP); Takashi Kitamura, Kyoto (JP); Tamio Ueda, Kyoto (JP); Mizuki Furuta, Kyoto (JP)

(73) Assignee: OMRON HEALTHCARE CO., LTD., Kyoto (JP)

( * ) Notice: Subject to any disclaimer, the term of this patent is extended or adjusted under 35 U.S.C. 154(b) by 140 days.

(21) Appl. No.: 17/447,357

(22) Filed: Sep. 10, 2021

(65) Prior Publication Data

US 2021/0401303 A1 Dec. 30, 2021

Related U.S. Application Data

(63) Continuation of application No. PCT/JP2020/005956, filed on Feb. 17, 2020.

(30) Foreign Application Priority Data

Mar. 15, 2019 (JP) ................. 2019-049074

(51) Int. Cl.
*A61B 5/0225* (2006.01)
*A61B 5/00* (2006.01)
(Continued)

(52) U.S. Cl.
CPC .......... *A61B 5/0225* (2013.01); *A61B 5/4812* (2013.01); *A61B 5/7285* (2013.01); *G16H 40/67* (2018.01); *G16H 50/30* (2018.01)

(58) Field of Classification Search
CPC ....... A61B 5/4812; A61B 8/04; A61B 17/135; A61B 5/022; A61B 5/0205; A61B 5/0225;
(Continued)

(56) References Cited

U.S. PATENT DOCUMENTS 5,253,648 A * 10/1993 Walloch ............. A61B 5/02116
600/494
2009/0234199 A1 * 9/2009 Takahashi ............. A61B 5/022
600/301

(Continued)

FOREIGN PATENT DOCUMENTS

CN 101394784 3/2009
JP 2001-70260 A 3/2001
(Continued)

OTHER PUBLICATIONS

Taylor, A. G. (2015). Get fit with Apple Watch: Using the Apple Watch for Health and Fitness. pp. xix-xx, 54-55, and 91 taken from the full document comprising introductory pages and 1-205. Apress. (Year: 2015).*

(Continued)

*Primary Examiner* — Alex M Valvis
*Assistant Examiner* — Jonathan M Haney
(74) *Attorney, Agent, or Firm* — Wenderoth, Lind & Ponack, L.L.P.

(57) ABSTRACT

A blood pressure measurement device according to an aspect includes a blood pressure measurement unit that measures a blood pressure of a user, a setting unit that sets a measurement scheduled time for a time a predetermined time period before a wake-up scheduled time of the user, and a measurement control unit that causes the blood pressure measurement unit to measure the blood pressure of the user in accordance with the set measurement scheduled time.

8 Claims, 13 Drawing Sheets

(51) Int. Cl.
*G16H 40/67* (2018.01)
*G16H 50/30* (2018.01)

(58) Field of Classification Search
CPC ............ A61B 5/7285; A61H 2230/30; A61M 2230/30; A63B 2230/30; G16H 40/67; G16H 50/30
See application file for complete search history.

(56) References Cited

U.S. PATENT DOCUMENTS

| | | | | |
|---|---|---|---|---|
| 2013/0226010 | A1* | 8/2013 | Hotta | A61B 5/025 600/490 |
| 2018/0177418 | A1* | 6/2018 | Yu | A61B 5/4812 |
| 2020/0178892 | A1* | 6/2020 | Maslik | A61B 5/4836 |

FOREIGN PATENT DOCUMENTS

| | | |
|---|---|---|
| JP | 2007-325613 A | 12/2007 |
| JP | 2013-102999 A | 5/2013 |
| WO | 2018/220087 | 12/2018 |

OTHER PUBLICATIONS

International Search Report for International Application No. PCT/JP2020/005956, dated Mar. 31, 2020.

English translation of International Preliminary Report on Patentability issued Sep. 16, 2021 in International (PCT) Application No. PCT/JP2020/005956.

International Preliminary Report on Patentability for International Application No. PCT/JP2020/005956, dated Sep. 3, 2020.

Chinese Office Action issued Dec. 11, 2023 in corresponding Chinese Patent Application No. 202080018147.7, with English translation.

* cited by examiner

[FIG. 1]
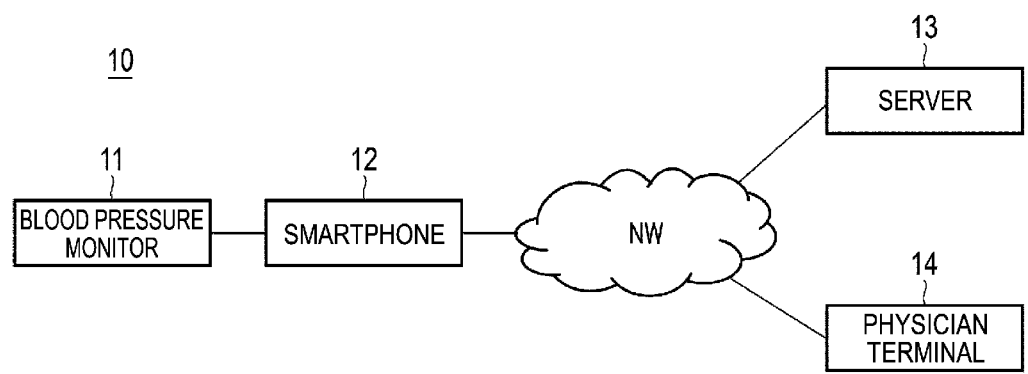

[FIG. 2]
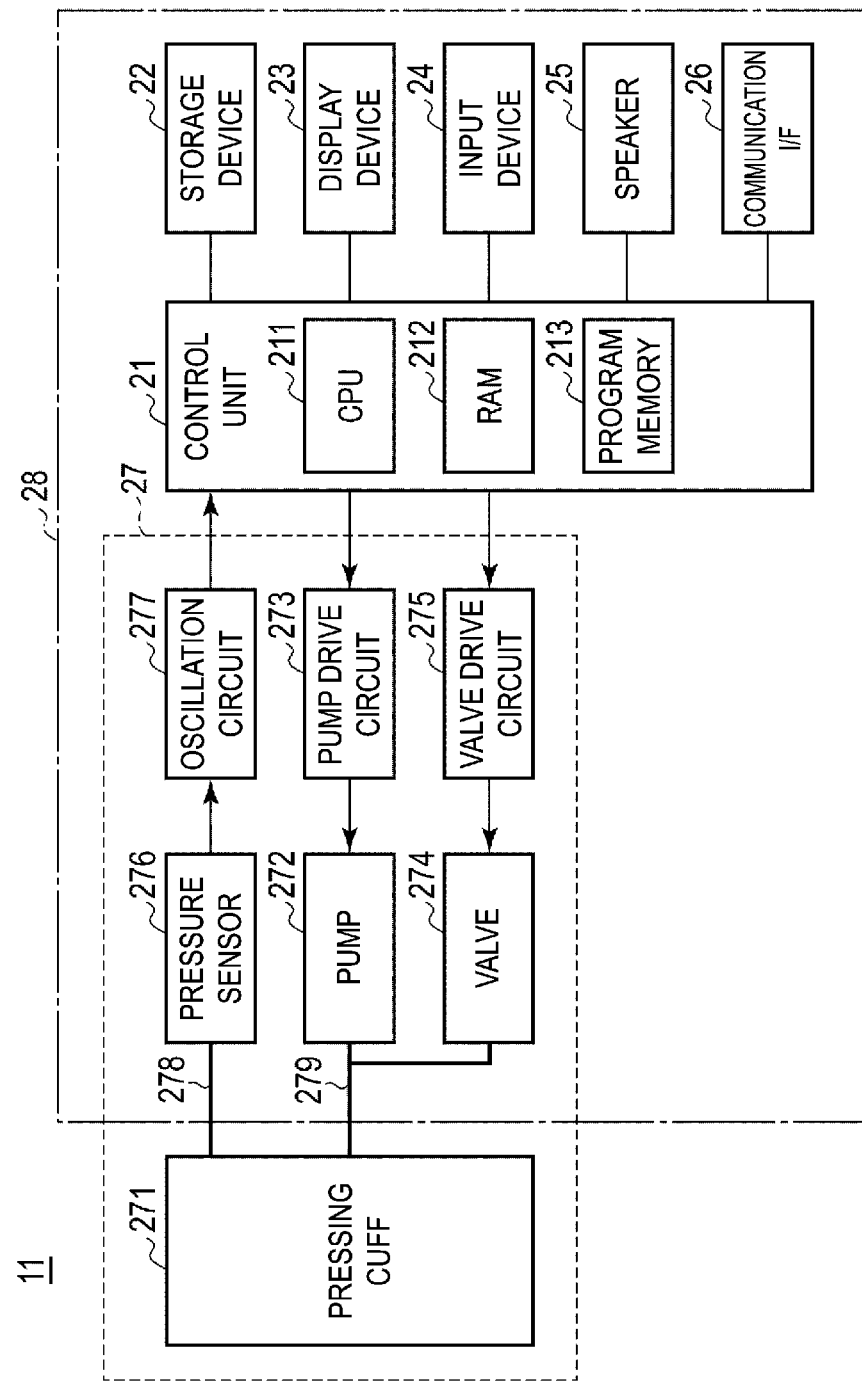

[FIG. 3]
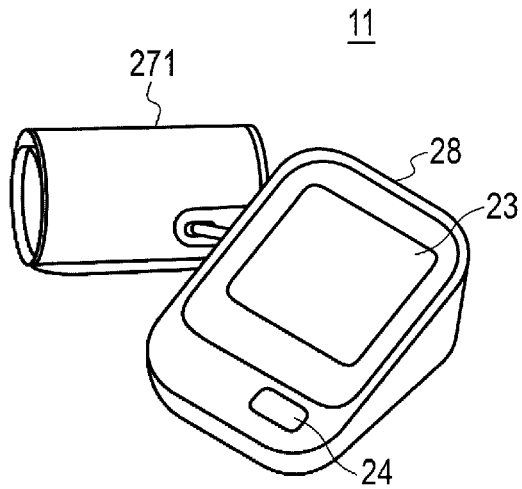
[FIG. 4]
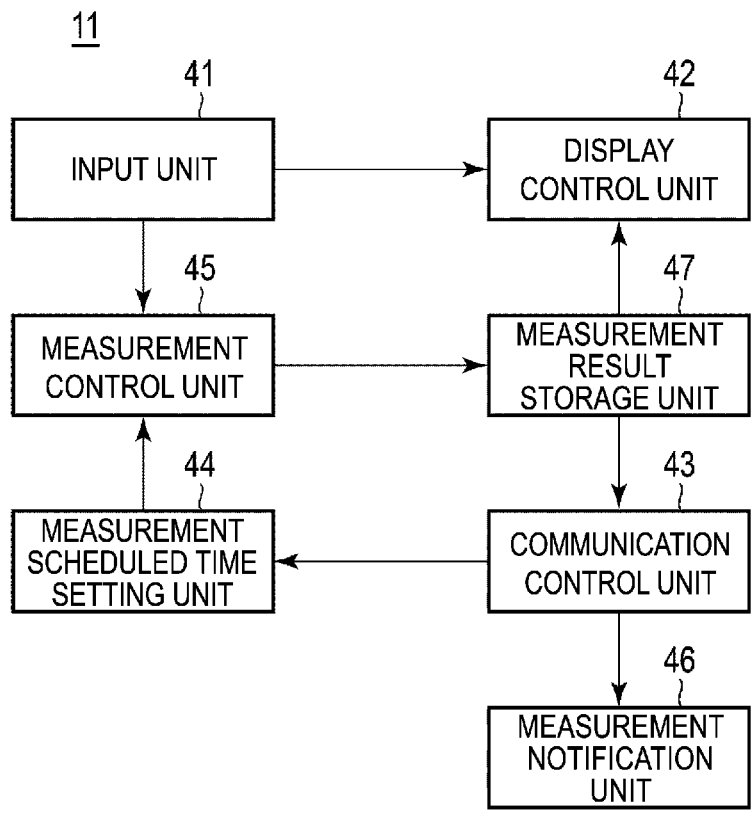

[FIG. 5]
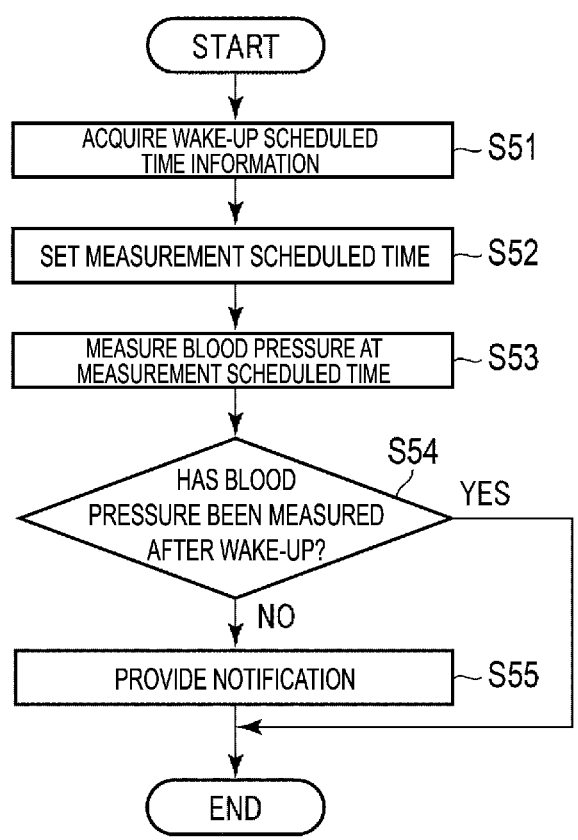

[FIG. 6]
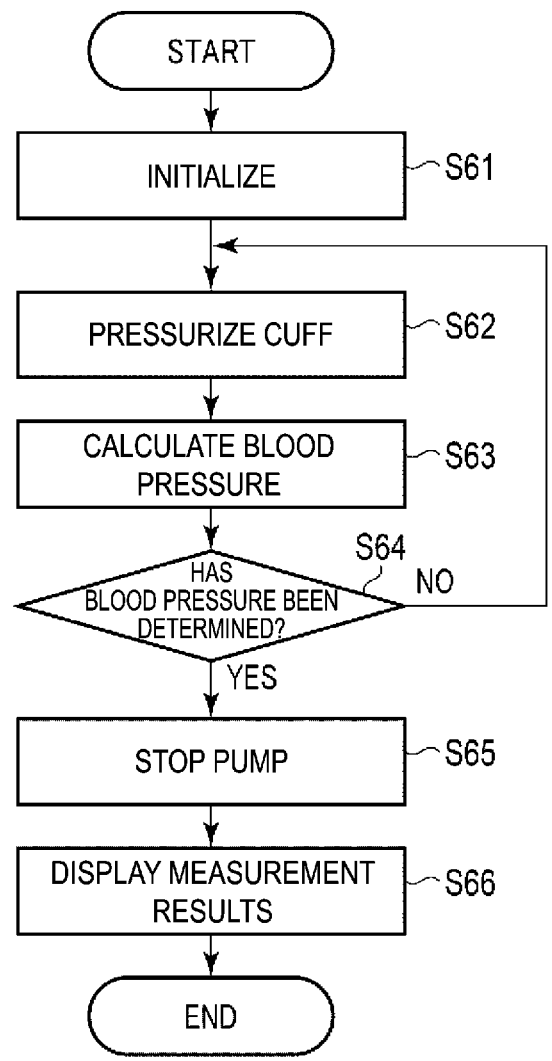

[FIG. 7]
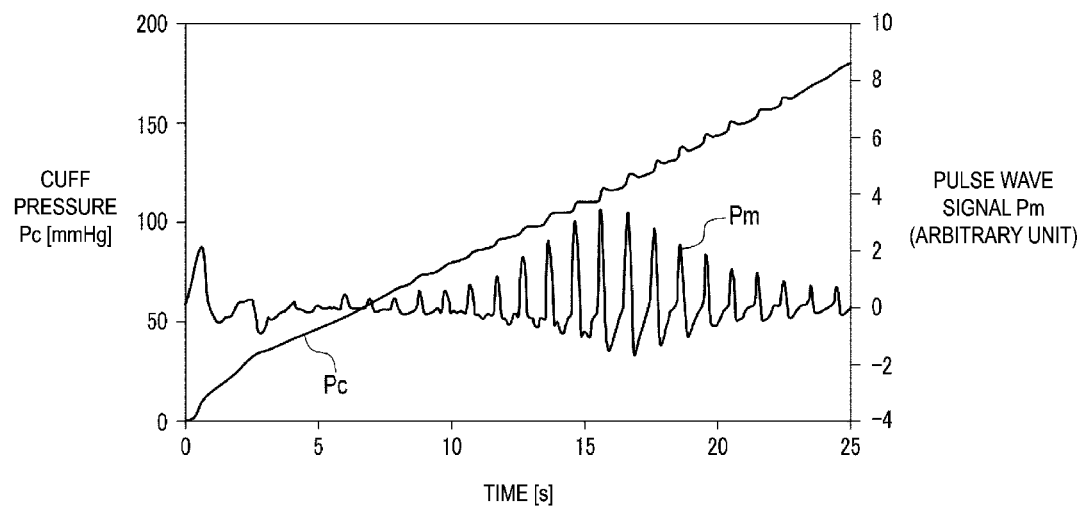

[FIG. 8]
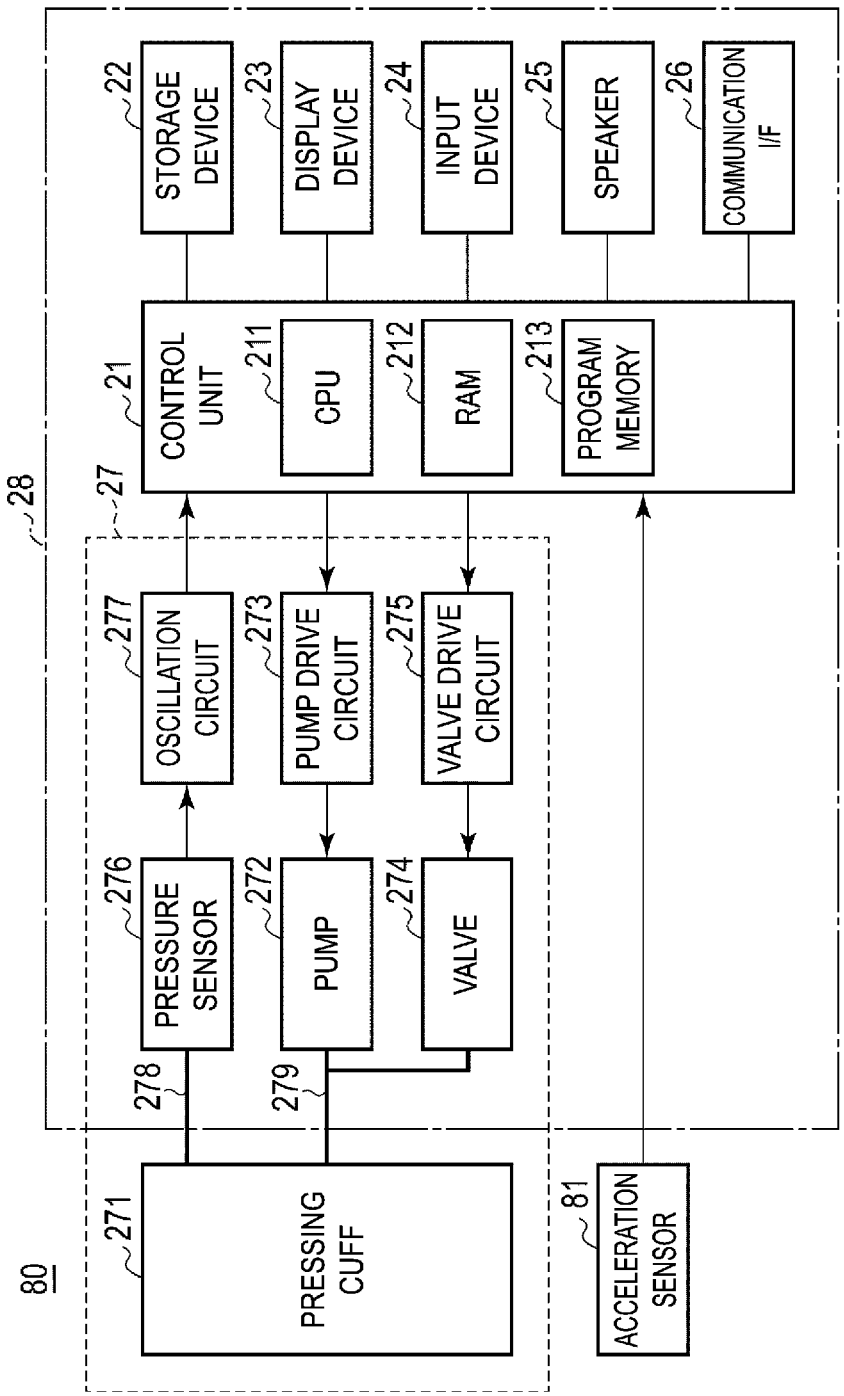

[FIG. 9]
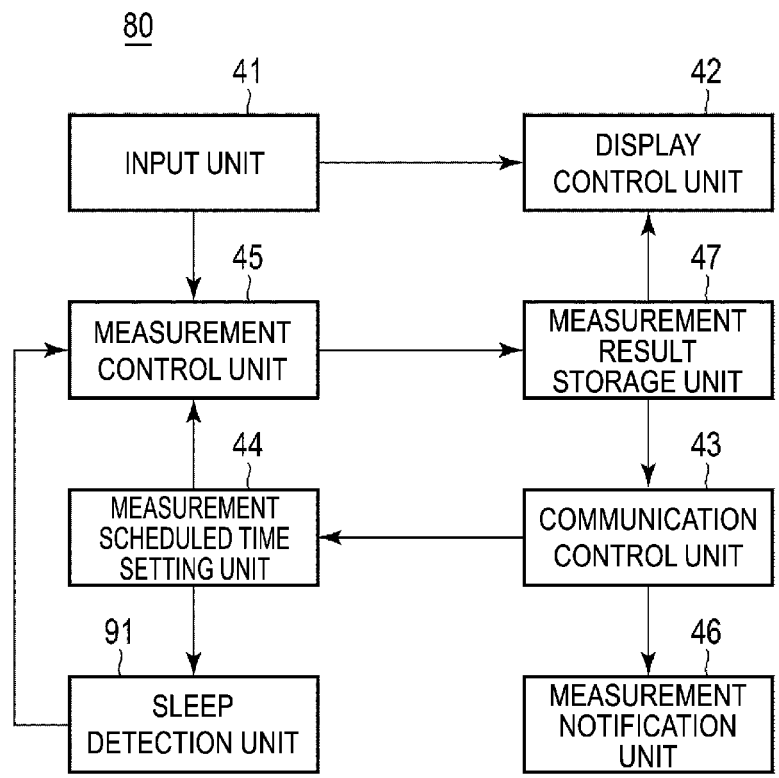
[FIG. 10]
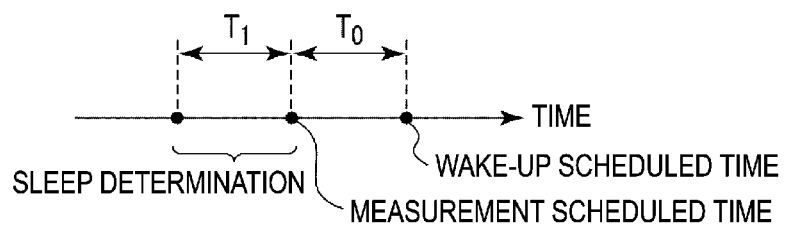

[FIG. 11]
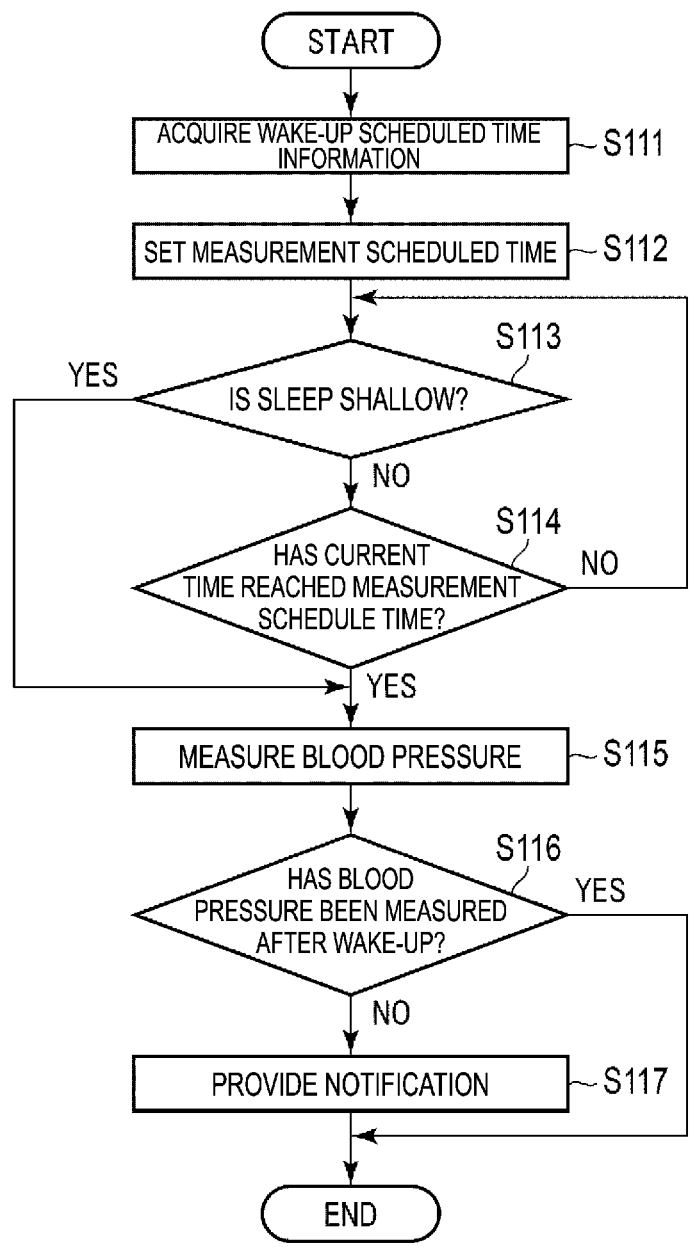

[FIG. 12]
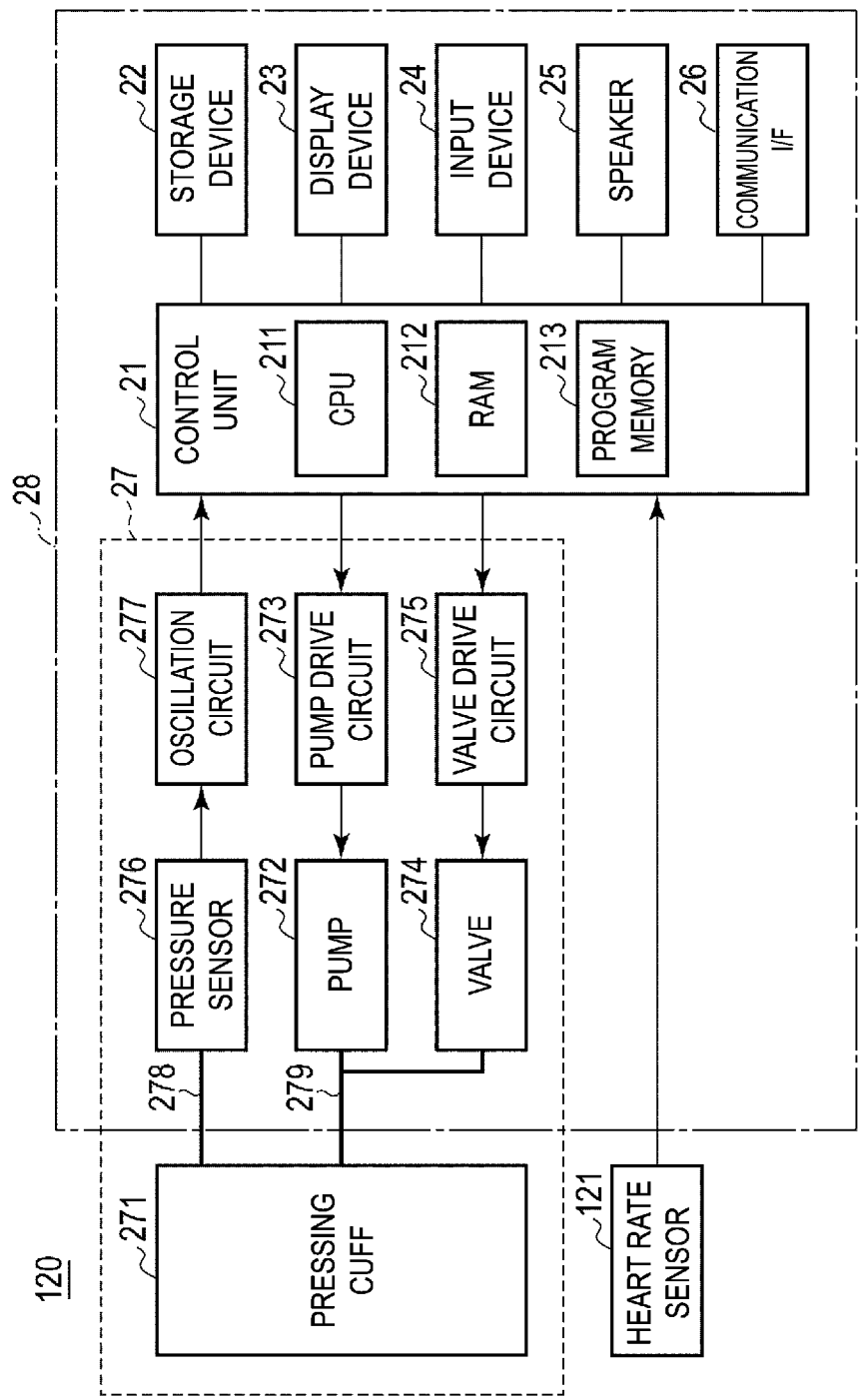

[FIG. 13]
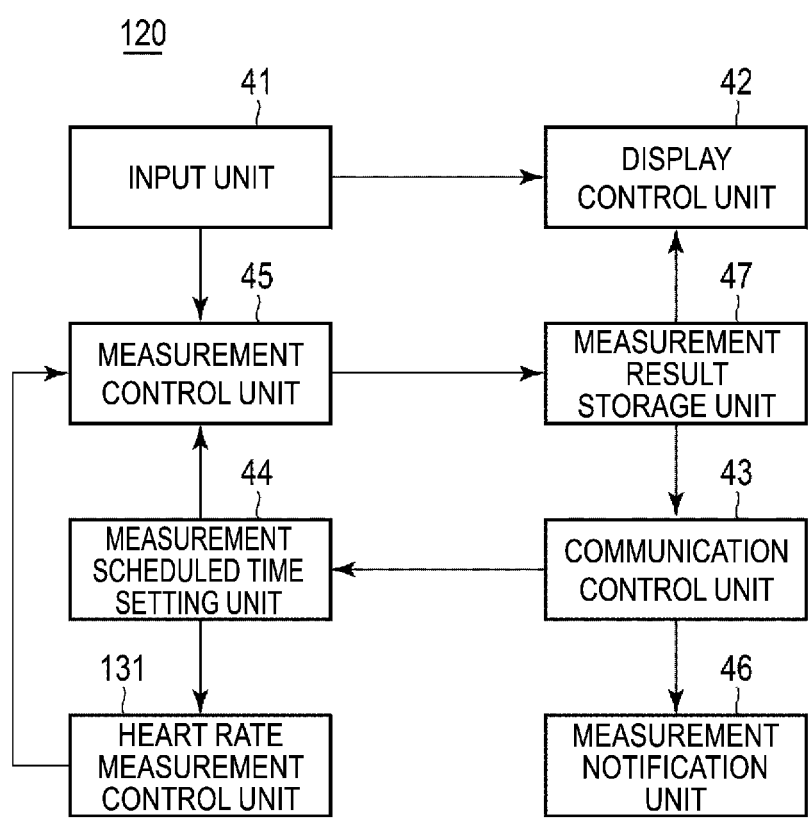

[FIG. 14]
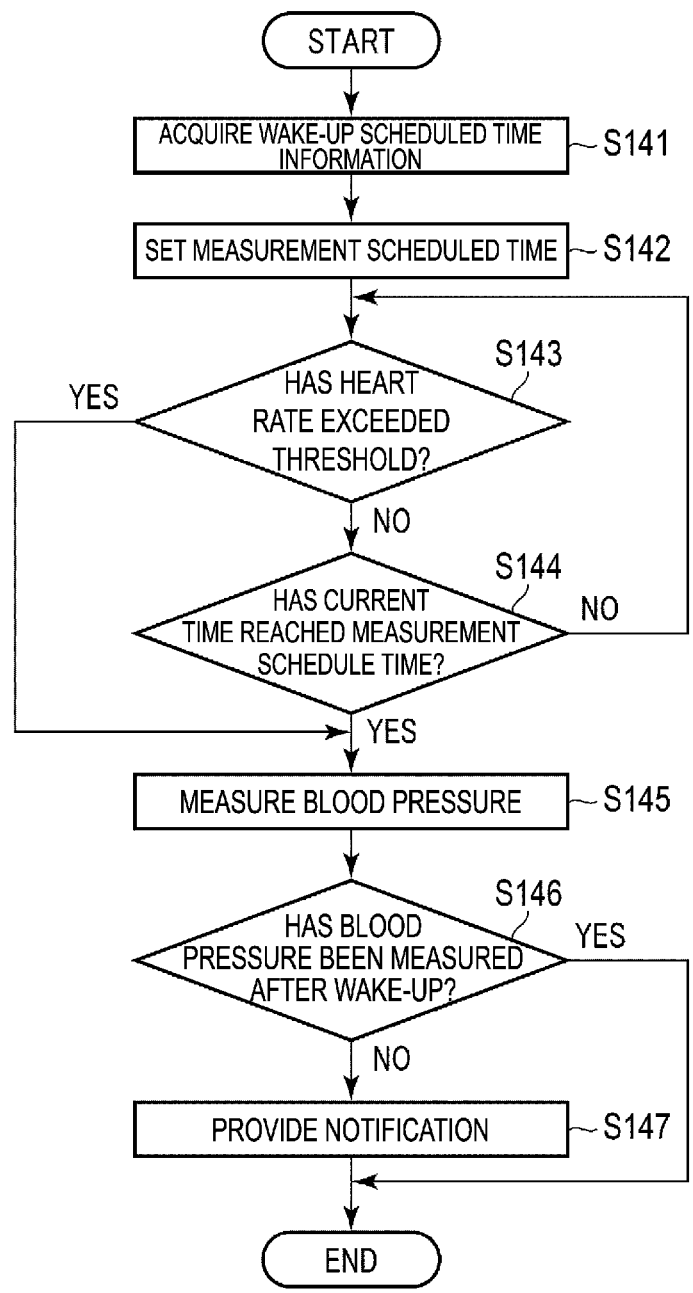

[FIG. 15]
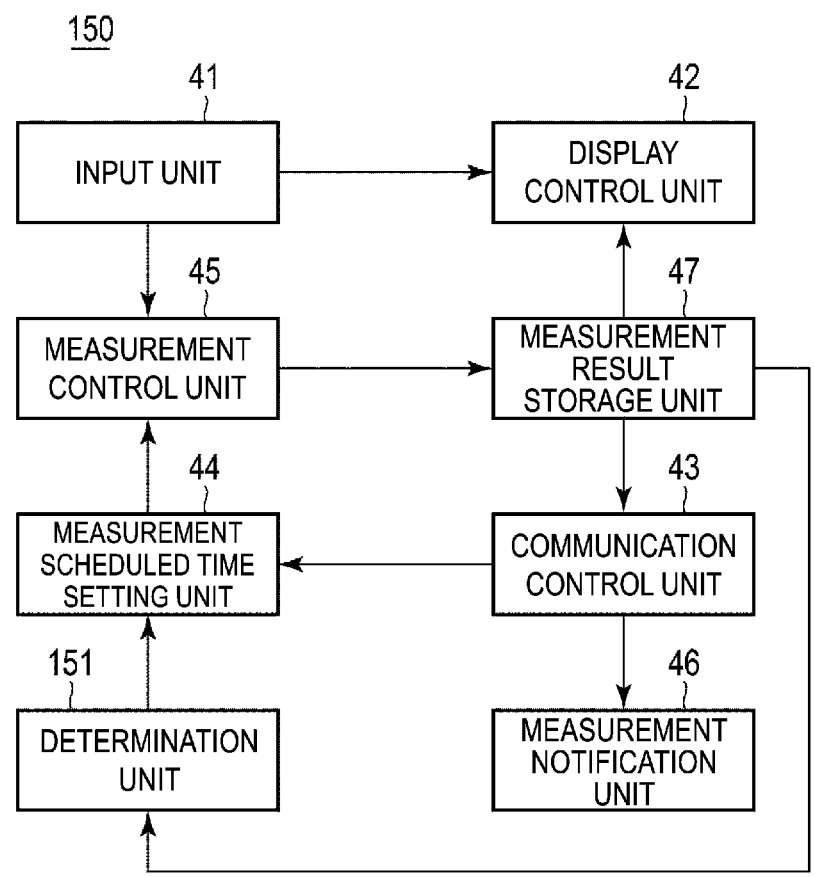

BLOOD PRESSURE MEASUREMENT DEVICE AND BLOOD PRESSURE MEASUREMENT METHOD

CROSS-REFERENCE TO RELATED APPLICATIONS

This application is the U.S. national stage application filed pursuant to 35 U.S.C. 365(c) and 120 as a continuation of International Patent Application No. PCT/JP2020/005956, filed Feb. 17, 2020, which application claims priority to Japanese Patent Application No. 2019-049074, filed Mar. 15, 2019, which applications are incorporated herein by reference in their entireties.

TECHNICAL FIELD

Aspects of the present invention relate to technology for measuring blood pressure of a user during sleep.

BACKGROUND ART

In general, blood pressures of human beings are lower during sleep than during wakefulness. However, high values of blood pressure may persist throughout the night without decreasing during sleep. Such a phenomenon is referred to as nocturnal hypertension. There are several types of nocturnal hypertension. In other types of nocturnal hypertension, transient blood pressure variations occur at timing when sleep deepens or immediately before wake-up. The nocturnal hypertension may be caused by a certain disease, and it is important to determine whether the user has nocturnal hypertension. This requires measuring the blood pressure of the user during sleep. For measurement of the blood pressure of the user during sleep, an electronic blood pressure monitor is known that is configured to measure the blood pressure of the user at a preset time (e.g., 2 a.m.) (see, e.g., Patent Document 1).

Meanwhile, for management of the blood pressure, it is important to know a blood pressure change before and after wake-up. For example, immediately before wake-up of the user, a transient blood pressure variation may occur in which the blood pressure surges suddenly and then decreases.

To detect such a blood pressure variation, the blood pressure needs to be measured before and after wake-up.

CITATION LIST

Patent Literature

Patent Document 1: JP 2001-70260 A

SUMMARY OF INVENTION

Technical Problem

In an electronic blood pressure monitor such as that disclosed in Patent Document 1, measurement time is generally set for a time when the user is assumed to be reliably asleep. This precludes blood pressure measurement before wake-up, and prevents detection of blood pressure changes before and after wake-up.

In view of the above-described circumstances, an object of the present invention is to provide a blood pressure measurement device and a blood pressure measurement method that enable observation of blood pressure changes before and after wake-up.

Solution to Problem

The present invention adopts the following configurations to solve the above-described problems.

In a first aspect of the present invention, a blood pressure measurement device includes a blood pressure measurement unit configured to measure a blood pressure of a user, a setting unit configured to set a measurement scheduled time for a time a predetermined time period before a wake-up scheduled time of the user, and a measurement control unit configured to cause the blood pressure measurement unit to measure the blood pressure of the user in accordance with the set measurement scheduled time.

According to the above-described configuration, the blood pressure is measured at the time the predetermined time period before the wake-up scheduled time of the user. This allows the blood pressure of the user to be measured immediately before wake-up. As a result, blood pressure changes before and after wake-up can be observed.

In a second aspect of the present invention, the setting unit sets the measurement scheduled time by using, as the wake-up scheduled time, an earliest alarm time of a plurality of preset alarm times when an alarm is output.

According to the above-described configuration, blood pressure measurement can be more reliably performed before the user wakes up.

In a third aspect of the present invention, the setting unit sets the measurement scheduled time by using a wake-up time of the user for a preceding day as the wake-up scheduled time.

According to the above-described configuration, blood pressure measurement can be more reliably performed before the user wakes up.

In a fourth aspect of the invention, the blood pressure measurement device further includes a sleep detection unit configured to detect a depth of sleep of the user, and the measurement control unit causes the blood pressure measurement unit to measure the blood pressure of the user when the sleep detection unit detects that the sleep is shallow within a time range ending at the set measurement scheduled time, and causes the blood pressure measurement unit to measure the blood pressure of the user at the set measurement scheduled time in a case where the sleep detection unit does not detect that the sleep is shallow within the time range.

According to the above-described configuration, blood pressure measurement can be performed at timing before wake-up when the blood pressure is predicted to be high. As a result, blood pressure changes before and after wake-up can be effectively observed.

In a fifth aspect of the present invention, the blood pressure measurement device further includes a heart rate measurement unit configured to measure a heart rate of the user, and the measurement control unit causes the blood pressure measurement unit to measure the blood pressure of the user when a measurement value of the heart rate exceeds a threshold that is preset, within a time range ending at the set measurement scheduled time, and causes the blood pressure measurement unit to measure the blood pressure of the user at the measurement scheduled time in a case where the measurement value of the heart rate does not exceed the threshold within the time range.

According to the above-described configuration, blood pressure measurement can be performed at timing before wake-up when the blood pressure is predicted to be high. As a result, blood pressure changes before and after wake-up can be effectively observed.

In a sixth aspect of the present invention, the blood pressure measurement device further includes a determination unit configured to determine the predetermined time period based on measurement results obtained by measuring the blood pressure of the user before the measurement scheduled time for a plurality of days.

According to the above-described configuration, blood pressure measurement can be performed at timing before wake-up when the blood pressure is likely to be high. As a result, blood pressure changes before and after wake-up can be effectively observed.

In a seventh aspect of the present invention, a blood pressure measurement method performed by a blood pressure measurement device including a blood pressure measurement unit configured to measure a blood pressure of a user includes the steps of setting a measurement scheduled time for a time a predetermined time period before a wake-up scheduled time of the user, and causing the blood pressure measurement unit to measure the blood pressure of the user in accordance with the set measurement scheduled time.

The seventh aspect can produce effects similar to those of the first aspect.

Advantageous Effects of Invention

According to the present invention, a blood pressure measurement device and a blood pressure measurement method can be provided that allow for observation of blood pressure changes before and after wake-up.

BRIEF DESCRIPTION OF DRAWINGS

FIG. 1 is a block diagram illustrating a health management system according to an embodiment.

FIG. 2 is a block diagram illustrating an example of a hardware configuration of the blood pressure monitor illustrated in FIG. 1.

FIG. 3 is a perspective view illustrating an example of the appearance of the blood pressure monitor illustrated in FIG. 1.

FIG. 4 is a block diagram illustrating an example of a software configuration of the blood pressure monitor illustrated in FIG. 1.

FIG. 5 is a flowchart illustrating an example of operation performed when the blood pressure monitor illustrated in FIG. 1 measures the blood pressure of a user during sleep.

FIG. 6 is a flow chart illustrating a procedure for blood pressure measurement by the blood pressure monitor illustrated in FIG. 1.

FIG. 7 is a diagram illustrating a relationship between cuff pressure and a pulse wave signal in blood pressure measurement by the blood pressure monitor illustrated in FIG. 1.

FIG. 8 is a block diagram illustrating an example of a hardware configuration of a blood pressure monitor according to an embodiment.

FIG. 9 is a block diagram illustrating an example of a software configuration of the blood pressure monitor illustrated in FIG. 8.

FIG. 10 is a diagram illustrating a time range in which the sleep detection unit illustrated in FIG. 9 performs detection.

FIG. 11 is a flowchart illustrating a procedure for blood pressure measurement by the blood pressure monitor illustrated in FIGS. 8 and 9.

FIG. 12 is a block diagram illustrating an example of a hardware configuration of a blood pressure monitor according to an embodiment.

FIG. 13 is a block diagram illustrating an example of a software configuration of the blood pressure monitor illustrated in FIG. 1.

FIG. 14 is a flow chart illustrating a procedure for blood pressure measurement by the blood pressure monitor illustrated in FIGS. 12 and 13.

FIG. 15 is a block diagram illustrating an example of a software configuration of the blood pressure monitor according to an embodiment.

DESCRIPTION OF EMBODIMENTS

Hereinafter, embodiments of the present invention will be described with reference to the drawings.

Overview

First, an overview of the present invention will be described with reference to FIG. 1.

FIG. 1 schematically illustrates a health management system 10 according to an embodiment. As illustrated in FIG. 1, health management system 10 includes an electronic blood pressure monitor 11, a smartphone 12, a server 13, and a physician terminal 14. The electronic blood pressure monitor 11 and the smartphone 12 are associated with a user who is a patient, and the physician terminal 14 is associated with the physician. The blood pressure monitor 11 communicates directly with the smartphone 12. The smartphone 12, the server 13, and the physician terminal 14 communicate with one another via a network NW such as the Internet.

The blood pressure monitor 11 is configured to measure the blood pressure of the user. The blood pressure monitor 11 is, for example, an oscillometric blood pressure monitor. As an example, measurement is scheduled to take place three times each day, before wake-up, after wake-up, and before bed. Specifically, the blood pressure monitor 11 performs manual measurement at 11 p.m. The user then goes to bed with the blood pressure monitor 11 attached. The blood pressure monitor 11 performs automatic measurement before wake-up of the user. Furthermore, the blood pressure monitor 11 performs manual measurement after wake-up. In this regard, manual measurement refers to measurement performed using, as a trigger, operation of the user such as button depression, and automatic measurement refers to measurement performed with no operation of the user. The blood pressure monitor 11 transmits measurement data indicative of a measurement result to the smartphone 12 each time measurement is performed. The blood pressure monitor 11 corresponds to a blood pressure measurement device of the present invention.

The blood pressure monitor 11 performs measurement before wake-up of the user, as described below. The blood pressure monitor 11 sets a measurement scheduled time for a time a predetermined time period before a wake-up scheduled time of the user, and measures the blood pressure of the user at the measurement scheduled time. In one example, as the wake-up scheduled time, an output time for a wake-up alarm set in the smartphone 12 is utilized. In this case, the blood pressure monitor 11 receives, from the smartphone 12, alarm data indicating an alarm time, corresponding to the time when the wake-up alarm is output, and considers, as a wake-up scheduled time, the alarm time indicated by the received alarm data. For example, in a case where the alarm time is 6:00 a.m. and the predetermined time period is 20 minutes, the measurement scheduled time is set for 5:40 a.m.

The smartphone 12 receives measurement data from the blood pressure monitor 11. The smartphone 12 includes an application that manages data related to a user (hereinafter referred to as user data) and including measurement results obtained by the blood pressure monitor 11. The application graphically displays the measurement results and displays the results of analysis of the measurement results. Furthermore, the smartphone 12 transmits the user data to the server 13.

The server 13 receives the user data from the smartphone 12 and manages the user data received. For example, the server 13 transmits the user data to the physician terminal 14 in response to a request from the physician terminal 14.

The physician terminal 14 is a computer such as a personal computer (PC). When the physician examines the user, the physician terminal 14 accesses the server 13 to obtain the user data. Specifically, the physician terminal 14 transmits a request to the server 13, and receives the user data from the server 13. The physician terminal 14 displays measurement results obtained by the blood pressure monitor 11 and included in the received user data. In this way, the measurement results obtained through measurement at the home of the user are utilized by the physician to examine the user.

In the health management system 10 having the configuration described above, the blood pressure monitor 11 sets the measurement scheduled time for the time the predetermined time period before the wake-up scheduled time of the user, and measures the blood pressure of the user at the measurement scheduled time. This allows the blood pressure measurement to be performed immediately before wake-up of the user. As a result, blood pressure variations before and after wake-up can be detected. For example, it is possible to observe whether a transient blood pressure variation has occurred immediately before wake-up.

Now, the blood pressure monitor 11 will be described in detail.

Configuration Example

Hardware Configuration

An example of the hardware configuration of the blood pressure monitor 11 will be described with reference to FIGS. 2 and 3. FIG. 2 is a block diagram that schematically illustrates a hardware configuration of the blood pressure monitor 11, and FIG. 3 is a perspective view schematically illustrating the appearance of the blood pressure monitor 11.

As illustrated in FIG. 2, the blood pressure monitor 11 includes a control unit 21, a storage device 22, a display device 23, an input device 24, a speaker 25, a communication interface 26, and a blood pressure measurement unit 27.

In one example, the blood pressure monitor 11 uses a dry battery as a power source.

The control unit 21 includes a Central Processing Unit (CPU) 211, a Random Access Memory (RAM) 212, a program memory 213, and the like and controls each of the components. The CPU 211 is an example of a hardware processor. The RAM 212 is a volatile memory such as a Static RAM (SRAM) is used as a working memory for the CPU 211. The program memory 213 stores programs and setting data necessary to execute the programs. As the program memory 213, for example, a Read-Only Memory (ROM) is used. Note that the program memory 213 may be part of the storage device 22.

The storage device 22 is a non-volatile memory, for example, flash memory, and stores data such as measurement results. A storage medium included in the storage device 22 is a medium that stores information such as recorded programs by an electrical, magnetic, optical, mechanical, or chemical action such that a computer, a machine, and the like can read the information such as the program.

The display device 23 displays information such as measurement results. The display device 23 is, for example, a segmented liquid crystal display device. The display device 23 may be a liquid crystal display device based on a dot matrix or an Organic Light Emitting Diode (OLED) display.

The input device 24 allows the user to input instructions to the blood pressure monitor 11. The input device 24 includes a plurality of push buttons, such as a start button for starting blood pressure measurement. Note that the input device 24 may be a touch panel provided on a screen of the display device 23.

The speaker 25 emits sound based on acoustic signals from the control unit 21. For example, speaker 25 is used to prompt the user to measure the blood pressure.

The communication interface 26 is an interface for communicating with an external device. The communication interface 26 includes, for example, a short-range wireless module such as a Bluetooth (trademark) module or a Bluetooth Low Energy (BLE) module and wirelessly communicates with the smartphone 12 (FIG. 1). The communication interface 26 may include, instead of the short-range wireless module, other wireless module such as a wireless Local Area Network (LAN) module. Additionally, the communication interface 26 may include a terminal such as a micro Universal Serial Bus (USB) connector and may communicate with an external device via a cable such as a USB cable.

The blood pressure measurement unit 27 measures the blood pressure. The blood pressure measurement unit 27 includes a pressing cuff 271, a pump 272, a pump drive circuit 273, a valve 274, a valve drive circuit 275, a pressure sensor 276, an oscillation circuit 277, and tubes 278, 279. In the example illustrated in FIG. 3, the pressing cuff 271 is separate from a body 28. In a case of blood pressure measurement, the pressing cuff 271 is attached to the upper arm of the user. The body 28 houses the control unit 21, the storage device 22, the display device 23, the input device 24, the speaker 25, the communication interface 26, the pump 272, the pump driver circuit 273, the valve 274, the valve drive circuit 275, the pressure sensor 276, and the oscillation circuit 277.

The pump 272 and the valve 274 are connected to the pressing cuff 271 via the tube 279. The pressure sensor 276 is connected to the pressing cuff 271 via the tube 278. Note that the tubes 278, 279 may be a common single pipe. The pump 272 is, for example, a piezoelectric pump and feeds air to the pressing cuff 271 through the tube 278 to increase pressure inside the pressing cuff 271. The pump drive circuit 273 is controlled by the control unit 21 and drives the pump 272. The valve drive circuit 275 is controlled by the control unit 21 and drives the valve 274. With the valve 274 open, the pressing cuff 271 is in communication with the atmosphere. The valve 274 includes the function of a check valve and prevents air from flowing into the pressing cuff 271 through the valve 274.

The pressure sensor 276 is, for example, a piezoresistive pressure sensor, detects pressure inside the pressing cuff 271 (hereinafter, also referred to as cuff pressure), and outputs an electrical signal representing the cuff pressure. The cuff pressure is, for example, pressure based on atmospheric pressure as a reference. The oscillation circuit 277 oscillates based on an electrical signal from the pressure sensor 276 and outputs, to the control unit 21, a frequency signal having a frequency in accordance with the electrical signal. An output of the pressure sensor 276 is used to control the pressure of the pressing cuff 271 and to calculate the blood pressure value using the oscillometric method.

Note that, with regard to the specific hardware configuration of the blood pressure monitor 11, omission, replacement, and addition of components can be made as appropriate according to the embodiment. For example, the control unit 21 may include a plurality of hardware processors. The blood pressure monitor 11 may be a wearable blood pressure monitor, such as a wristwatch type blood pressure monitor.

Software Configuration

With reference to FIG. 4, an example of a software configuration of the blood pressure monitor 11 will be described. FIG. 4 is a block diagram illustrating an example of the software configuration of the blood pressure monitor 11. As illustrated in FIG. 4, the blood pressure monitor 11 includes an input unit 41, a display control unit 42, a communication control unit 43, a measurement scheduled time setting unit 44, a measurement control unit 45, a measurement notification unit 46, and a measurement result storage unit 47. The input unit 41, the display control unit 42, the communication control unit 43, the measurement scheduled time setting unit 44, the measurement control unit 45, and the measurement notification unit 46 execute the following processes by the control unit 21 of the blood pressure monitor 11 executing programs stored in the program memory 213. When the control unit 21 executes a program, the control unit 21 unfolds the program in the RAM 212. Then, the control unit 21 causes the CPU 211 to interpret and execute the program unfolded in the RAM 212 to control each of the components. The measurement result storage unit 47 is provided in the storage device 22.

The input unit 41 receives an input from the user. The input unit 41 receives, from the input device 24, an operation signal corresponding to an operation performed by the user on the input device 24 and determines contents of an instruction input by the user based on the operation signal. The instruction includes, for example, an instruction to start blood pressure measurement, an instruction to suspend the blood pressure measurement, an instruction to display a history of measurement results, and an instruction to transmit measurement data to the smartphone 12. For example, in a case where the user instructs the start of blood pressure measurement, the input unit 41 provides a measurement start instruction signal to the measurement control unit 45. In a case where the user instructs the display of the history of measurement results, the input unit 41 provides a history display signal to the display control unit 42.

The display control unit 42 controls the display device 23 and causes the display device 23 to display information. For example, the display control unit 42 receives measurement results from the measurement control unit 45 via the measurement result storage unit 47 after the blood pressure measurement, and causes the display device 23 to display the measurement results. Additionally, in response to reception of the history display signal from the input unit 41, the display control unit 42 reads measurement results from the measurement result storage unit 47 in accordance with the user instruction, and causes the display device 23 to display the measurement results.

The communication control unit 43 controls the communication interface 26. The communication control unit 43 receives measurement results from the measurement control unit 45 via the measurement result storage unit 47 after the blood pressure measurement, and transmits measurement data indicating the measurement results, to the smartphone 12 (FIG. 1) via the communication interface 26. The communication control unit 43 receives alarm data indicative of the alarm time from the smartphone 12 via the communication interface 26, and provides the received alarm data to the measurement scheduled time setting unit 44 and the measurement notification unit 46.

The measurement scheduled time setting unit 44 sets the measurement scheduled time based on the wake-up scheduled time of the user. The measurement scheduled time is a time at which blood pressure measurement is scheduled to be performed. In the present embodiment, the measurement scheduled time setting unit 44 sets the measurement scheduled time for the time a predetermined time period before the wake-up scheduled time of the user. The predetermined time period may be, for example, 5 minutes, 10 minutes, 20 minutes, 30 minutes, 1 hour, or the like.

In one example, the measurement scheduled time setting unit 44 receives the alarm data from the communication control unit 43, and uses an alarm time indicated by the received alarm data as a wake-up scheduled time to set the measurement scheduled time. Specifically, the measurement scheduled time setting unit 44 sets the measurement scheduled time for the time the predetermined time period before the alarm time. The measurement scheduled time setting unit 44 provides the measurement control unit 45 with measurement scheduled time information indicating the set measurement scheduled time.

The wake-up alarm refers to, for example, an alarm that is estimated to be set for a user to wake up. For example, an alarm that is within a specified time range (e.g., a time range from 5 a.m. to 9 a.m.) is considered as a wake-up alarm. In a case where a plurality of alarm times for the wake-up alarm are set in the smartphone 12, the earliest alarm time of these alarm times is used as the wake-up scheduled time. For example, in a case where alarm times of 6:00 a.m. and 6:30 a.m. are set, the measurement scheduled time setting unit 44 sets the measurement scheduled time using 6:00 a.m. as the wake-up scheduled time.

Note that the blood pressure monitor 11 may acquire alarm data from any other device including an alarm function and a communication function, such as an alarm clock. Additionally, the blood pressure monitor 11 may include the alarm function, and the output time of the wake-up alarm may be input to the blood pressure monitor 11 by the user.

In another example, the measurement scheduled time setting unit 44 sets the measurement scheduled time using the wake-up time of the preceding day as the wake-up scheduled time. For example, the time the user woke up on March 5 is used as the wake-up scheduled time on March 6. The wake-up time is detected by, for example, the blood pressure monitor 11. As an example, the blood pressure monitor 11 estimates, as a wake-up time, the time at which the user has removed the pressing cuff 271 from the upper arm. The action of the user removing the pressing cuff 271 from the upper arm can be detected based on, for example, an output of an acceleration sensor provided in the pressing cuff 271. The wake-up time may be detected by the smartphone 12. For example, the smartphone 12 estimates the time at which the user lifted the smartphone 12 as a wake-up time. The action of the user lifting the smartphone 12 may be detected based on an output of an acceleration sensor provided in the smartphone 12. The smartphone 12 transmits, to the blood pressure monitor 11, wake-up time information indicating the detected wake-up time.

The measurement control unit 45 controls the blood pressure measurement unit 27. For example, in response to reception of a measurement start instruction signal from the input unit 41, the measurement control unit 45 causes the blood pressure measurement unit 27 to measure the blood pressure. Furthermore, the measurement control unit 45 receives measurement scheduled time information from the measurement scheduled time setting unit 44. The measurement control unit 45 causes the blood pressure measurement unit 27 to measure the blood pressure at a measurement scheduled time indicated by the received measurement scheduled time information.

The measurement control unit 45 controls operations associated with blood pressure measurement. The measurement control unit 45 controls the pump drive circuit 273 and the valve drive circuit 275 to perform blood pressure measurement in accordance with the oscillometric method. The measurement control unit 45 brings the valve 274 into a closed state via the valve drive circuit 275 and drives the pump 272 via the pump drive circuit 273. Accordingly, air starts to be fed to the pressing cuff 271. The pressing cuff 271 is inflated to compress the upper arm of the user. When the calculation of the blood pressure value is completed, the measurement control unit 45 stops the pump 272 via the pump drive circuit 273 and brings the valve 274 into an open state via the valve drive circuit 275. Accordingly, air is exhausted from the pressing cuff 271. The measurement control unit 45 monitors cuff pressure by using the pressure sensor 276. In a case where cuff pressure exceeds an upper pressure limit before the calculation of the blood pressure value is completed, the measurement control unit 45 stops the pump 272 via the pump drive circuit 273 and brings the valve 274 into the open state via the valve drive circuit 275.

The upper pressure limit is predetermined from the viewpoint of safety. The upper pressure limit is determined to be 300 mmHg, for example.

The measurement control unit 45 calculates the blood pressure value using the oscillometric method based on a pressure signal output from the pressure sensor 276 in a pressurizing process of feeding air to the pressing cuff 271. The blood pressure value includes systolic blood pressure (SBP) and diastolic blood pressure (DBP), but is not limited to these. The measurement control unit 45 stores the calculated blood pressure value in the measurement result storage unit 47 in association with time information. The measurement control unit 45 can calculate a pulse rate as well as the blood pressure value.

The measurement notification unit 46 notifies the user of the timing at which the blood pressure is to be measured. The notification is provided using the display device 23 and/or the speaker 25. In one example, the measurement notification unit 46 provides notification in a case where measurement is not performed from the wake-up scheduled time of the user to the time the predetermined time period after the wake-up scheduled time, and otherwise does not provide notification. The predetermined time period may be, for example, 10 minutes, 20 minutes, 30 minutes, etc. The wake-up scheduled time used in the measurement notification unit 46 may be the same as the wake-up scheduled time used in the measurement scheduled time setting unit 44. For example, the measurement notification unit 46 receives the alarm data from the communication control unit 43, and uses the alarm time indicated by the received alarm data as the wake-up scheduled time. In another example, the measurement notification unit 46 provides notification in a case where measurement is not performed from the wake-up time of the user for the day to the time the predetermined time period after the wake-up time, and otherwise does not provide notification.

Note that, in the present embodiment, the example has been described in which all of the functions of the blood pressure monitor 11 are realized by a general-purpose processor. However, some or all of the functions of the blood pressure monitor 11 may be realized by one or a plurality of dedicated processors.

Operation Example

FIG. 5 schematically illustrates an operational flow for the blood pressure monitor 11 to measure the blood pressure of the user before and after wake-up. In step S51 in FIG. 5, the control unit 21 acquires wake-up scheduled time information indicating the wake-up scheduled time of the user.

For example, the control unit 21 functions as the communication control unit 43 to receive alarm data indicating an alarm time set for the wake-up alarm, from the smartphone 12 via the communication interface 26. The control unit 21 treats, as the wake-up scheduled time, the alarm time indicated by the received alarm data.

In step S52, the control unit 21 functions as the measurement scheduled time setting unit 44, and sets the measurement scheduled time for the time the predetermined time period before the wake-up scheduled time.

In step S53, the control unit 21 functions as the measurement control unit 45 to control the blood pressure measurement unit 27 such that the pressure measurement unit 27 measures the blood pressure of the user at the measurement scheduled time set by the measurement scheduled time setting unit 44.

In step S54, the control unit 21 determines whether the blood pressure has been measured after wake-up of the user. For example, the control unit 21 determines whether measurement has been performed from the wake-up scheduled time of the user to the time the predetermined time period after the wake-up scheduled time. In a case where the blood pressure has not been measured after wake-up of the user (step S54; No), in step S55, the control unit 21 functions as the measurement notification unit 46 to provide notification to prompt blood pressure measurement. For example, sound is emitted from the speaker 25. Subsequently, the processing is ended. On the other hand, in a case where the blood pressure has been measured after wake-up of the user (step S54; Yes), the processing is ended without notification.

FIG. 6 schematically illustrates an operational flow when the blood pressure monitor 11 measures the blood pressure in accordance with the oscillometric method. The control unit 21 starts blood pressure measurement when the current time reaches the measurement scheduled time or in response to a blood pressure measurement start instruction from the user.

In step S61 in FIG. 6, the control unit 21 functions as the measurement control unit 45 to perform initialization for blood pressure measurement. For example, the control unit 21 initializes a memory region for processing.

Furthermore, the control unit 21 opens the valve 274 via the valve drive circuit 275. Accordingly, the air inside the pressing cuff 271 is exhausted. Subsequently, the control unit 21 sets a current output value of the pressure sensor 276 as a reference value for the cuff pressure.

In step S62, the control unit 21 functions as the measurement control unit 45 to perform control of pressurizing the pressing cuff 271. For example, the control unit 21 closes the valve 274 via the valve drive circuit 275 and drives the pump 272 via the pump drive circuit 273. Accordingly, air is fed to the pressing cuff 271 to inflate the pressing cuff 271, and a cuff pressure Pc gradually increases as illustrated in FIG. 7. The control unit 21 monitors the cuff pressure Pc by the pressure sensor 276 and acquires a pulse wave signal Pm representing a variable component of arterial volume.

In step S63 in FIG. 6, the control unit 21 functions as the measurement control unit 45 and attempts to calculate the blood pressure value based on the pulse wave signal Pm acquired at this point in time. In a case where the blood pressure value fails to be calculated yet due to lack of data at this point in time (step S64; No), the processing from step S62 to step S64 is repeated as long as the cuff pressure Pc has not reached an upper pressure limit.

In a case where the blood pressure value can be calculated (step S64;

Yes), in step S65, the control unit 21 functions as the measurement control unit 45 to stop the pump 272 via the pump drive circuit 273 and to open the valve 274 via the valve drive circuit 275. Accordingly, the air inside the pressing cuff 271 is exhausted. In step S66, the control unit 21 functions as the measurement control unit 45 to save the measurement results in the storage device 22, and further functions as the display control unit 42 to cause the display device 23 to display the measurement results.

Note that the operational flow illustrated in FIG. 5 or FIG. 6 is merely an example and that the procedure and contents of the processing can be appropriately changed. For example, the processing in steps S54 and S55 may be deleted. In this case, the smartphone 12 may execute processing similar to the processing in steps S54 and S55. Additionally, in FIG. 6, the calculation of the blood pressure value is executed in the pressurizing process in which air is fed to the pressing cuff 271, but may be executed in a depressurizing process in which the air inside the pressing cuff 271 is exhausted.

Effects

The blood pressure monitor 11 having the configuration described above sets the measurement scheduled time for the time the predetermined time period before the wake-up scheduled time of the user, and measures the blood pressure of the user at the measurement scheduled time. This allows the blood pressure of the user to be measured immediately before wake-up.

As a result, blood pressure changes before and after wake-up can be observed. This enables, for example, detection of a transient blood pressure variation in which the blood pressure surges suddenly and then decreases, and which may occur immediately before wake-up.

In one example, the blood pressure monitor 11 uses the earliest alarm time of the plurality of alarm times set for the wake-up alarm as the wake-up scheduled time to set the measurement scheduled time. Accordingly, blood pressure measurement can be more reliably performed before the user wakes up. In another example, the blood pressure monitor 11 sets the measurement scheduled time using the wake-up time of the user for the preceding day as the wake-up scheduled time. Accordingly, blood pressure measurement can be more reliably performed before the user wakes up.

The blood pressure monitor 11 provides notification to prompt the user to measure the blood pressure in a case where the blood pressure has not been measured after wake-up of the user. Accordingly, the blood pressure is more reliably measured after wake-up. As a result, it is possible to more reliably observe blood pressure changes before and after wake-up.

Modified Examples

Note that the invention is not limited to the embodiments described above.

Human beings are known to have a shallow sleep depth and a high heart rate as the activity of the sympathetic nerves increases during sleep. In this state, the blood pressure is likely to surge suddenly. Thus, by measuring the blood pressure when the user is in a shallow sleep state or has a high heart rate during sleep, a high blood pressure caused by a sudden surge in blood pressure can be detected.

FIG. 8 schematically illustrates an example of a hardware configuration of the blood pressure monitor 80 according to an embodiment. In FIG. 8, components similar to those illustrated in FIG. 2 are given the same reference numerals, and descriptions thereof will be omitted as appropriate.

The blood pressure monitor 80 illustrated in FIG. 8 corresponds to the blood pressure monitor 11 illustrated in FIG. 2 supplemented with an acceleration sensor 81. The acceleration sensor 81 is, for example, a 3-axis acceleration sensor. The acceleration sensor 81 is attached to the user. The acceleration sensor 81 is provided in the pressing cuff 271. An output of the acceleration sensor 81 is provided to the control unit 21. With the pressing cuff 271 attached to the user, the output of the acceleration sensor 81 changes depending on the body motion of the user. Human beings have large body motions when the sleep is shallow (REM sleep state), and have small body motions when the sleep is deep (non-REM sleep state). Thus, whether the sleep is shallow or deep can be determined based on the output of the acceleration sensor 81.

FIG. 9 schematically illustrates an example of a software configuration of the blood pressure monitor 80. In FIG. 9, elements similar to those illustrated in FIG. 4 are given the same reference numerals, and descriptions thereof will be omitted as appropriate.

The blood pressure monitor 80 illustrated in FIG. 9 corresponds to the blood pressure monitor 80 illustrated in FIG. 4 supplemented with a sleep detection unit 91. The sleep detection unit 91 detects the depth of sleep of the user based on the output of the acceleration sensor 81. For example, as illustrated in FIG. 10, the sleep detection unit 91 performs detection within a time range from a time a predetermined time period $T_1$ before a measurement scheduled time to the measurement scheduled time. The predetermined time period $T_1$ may be the same as or different from a time difference $T_0$ between the measurement scheduled time and the wake-up scheduled time. In response to detection of shallow sleep, the sleep detection unit 91 provides a detection signal to the measurement control unit 45.

In response to reception of a detection signal from the sleep detection unit 91, the measurement control unit 45 starts blood pressure measurement. In a case of receiving no detection signal from the sleep detection unit 91, the measurement control unit 45 starts blood pressure measurement at the measurement scheduled time. In other words, the measurement control unit 45 causes the blood pressure measurement unit 27 to measure the blood pressure of the user when the sleep of the user is shallow within the time range ending at the measurement scheduled time, and causes blood pressure measurement unit 27 to measure the blood pressure of the user at the measurement scheduled time in a case where the sleep of the user is not shallow within the time range.

FIG. 11 schematically illustrates an operational flow for the blood pressure monitor 80 to measure the blood pressure of the user before and after wake-up. The processing in steps S111, S112, S116, and S117 in FIG. 11 is similar to the processing in steps S51, S52, S54, and S55 illustrated in FIG. 5.

In step S111 in FIG. 11, the control unit 21 acquires wake-up scheduled time information indicating the wake-up scheduled time of the user. In step S112, the control unit 21 functions as the measurement scheduled time setting unit 44, to set the measurement scheduled time for a time a predetermined time period (for example, 10 minutes) before the wake-up scheduled time.

In step S113, when the current time reaches a time a predetermined time period (e.g., 15 minutes) before the measurement scheduled time, the control unit 21 functions as the sleep detection unit 91 to determine whether the sleep of the user is shallow. In a case where the control unit 21 determines that the sleep is shallow (step S113; Yes), the processing proceeds to step S115.

In a case where the control unit 21 determines that the sleep is deep (step S113; No), the processing proceeds to step S114. In a case where the current time has not reached the measurement scheduled time (step S114; No), the processing returns to step S113. In a case where the current time has reached the measurement scheduled time (step S114; Yes), the processing proceeds to step S115.

In step S115, the control unit 21 functions as the measurement control unit 45 to control the blood pressure measurement unit 27 such that the blood pressure measurement unit 27 measures the blood pressure of the user. The control unit 21 causes the blood pressure measurement unit 27 to measure the blood pressure of the user when the sleep detection unit 91 detects that the sleep of the user is shallow within a time range ending at the measurement scheduled time, and causes the blood pressure measurement unit 27 to measure the blood pressure of the user at the measurement scheduled time in a case where the sleep detection unit 91 does not detect that the sleep of the user is shallow within the time range.

In step S116, the control unit 21 determines whether the blood pressure has been measured after wake-up of the user. In a case where the blood pressure has not been measured after wake-up (step S116; No), in step S117, the control unit 21 functions as the measurement notification unit 46 to provide notification to prompt blood pressure measurement. Subsequently, the processing is ended. In a case where the blood pressure has been measured after wake-up (step S116; Yes), the processing is ended without notification.

According to the blood pressure monitor 80 having the configuration described above, the blood pressure can be measured at timing immediately before wake-up of the user when the blood pressure is predicted to be high. As a result, blood pressure changes before and after wake-up can be effectively observed.

In contrast to the above description, the blood pressure monitor 80 may measure the blood pressure of the user when the sleep of the user is deep within a time range ending at the measurement scheduled time.

The sleep detection unit 91 of the blood pressure monitor 80 may detect the depth of sleep at multiple (e.g., four) levels. In this case, the measurement control unit 45 may control the blood pressure measurement unit 27 such that the blood pressure measurement unit 27 measures the blood pressure at the measurement scheduled time set by the measurement scheduled time setting unit 44, and may output measurement results including a blood pressure measurement value and a level representing the depth of the sleep. The measurement results are useful to the physician to know the blood pressure status of the user.

FIG. 12 schematically illustrates an example of a hardware configuration of a blood pressure monitor 120 according to an embodiment. In FIG. 12, components similar to those illustrated in FIG. 2 are given the same reference numerals, and descriptions thereof will be omitted as appropriate.

The blood pressure monitor 120 illustrated in FIG. 12 corresponds to the blood pressure monitor 11 illustrated in FIG. 2 supplemented with a heart rate sensor 121. The heart rate sensor 121 measures the heart rate of the user. The heart rate sensor 121 is configured to be attachable to the user. For example, the heart rate sensor 121 is provided in the pressing cuff 271. An output of the heart rate sensor 121 is provided to the control unit 21. The heart rate sensor 121 corresponds to a heart rate measurement unit of the present invention.

FIG. 13 schematically illustrates an example of a software configuration of the blood pressure monitor 120. In FIG. 13, elements similar to those illustrated in FIG. 4 are given the same reference numerals, and descriptions thereof will be omitted as appropriate.

The blood pressure monitor 120 illustrated in FIG. 13 corresponds to the blood pressure monitor 11 illustrated in FIG. 4 supplemented with a heart rate measurement control unit 131. The heart rate measurement control unit 131 controls the heart rate sensor 121. For example, the heart rate measurement control unit 131 drives the heart rate sensor 121 within a time range from a time a predetermined time period before a measurement scheduled time to the measurement scheduled time. The heart rate measurement control unit 131 provides the measurement control unit 45 with a measurement value of the heart rate obtained by the heart rate sensor 121.

The measurement control unit 45 causes the blood pressure measurement unit 27 to measures the blood pressure of the user when the heart rate of the user exceeds a threshold (e.g., 80 bpm) within a time range ending at the measurement scheduled time, and causes the blood pressure measurement unit 27 to measure the blood pressure of the user at the measurement scheduled time in a case where the heart rate of the user has not exceeded the threshold within the time range.

FIG. 14 schematically illustrates an operational flow for the blood pressure monitor 120 to measure the blood pressure of the user before and after wake-up. The processing in steps S141, S142, S146, and S147 in FIG. 14 is similar to the processing in steps S51, S52, S54, and S55 illustrated in FIG. 5.

In step S141 in FIG. 14, the control unit 21 acquires wake-up scheduled time information indicating the wake-up scheduled time of the user. In step S142, the control unit 21 functions as the measurement scheduled time setting unit 44 to set the measurement scheduled time for a time a predetermined time period before the wake-up scheduled time.

When the current time reaches a time a predetermined time period before the measurement scheduled time, the control unit 21 drives the heart rate sensor 121 to measure the heart rate of the user. In step S143, the control unit 21 functions as the measurement control unit 45 to determine whether the heart rate of the user has exceeded a threshold. In a case where the heart rate of the user has exceeded the threshold (step S143; Yes), the processing proceeds to step S145.

In a case where the heart rate of the user has not exceeded the threshold (step S143; No), the processing proceeds to step S144. In a case where the current time has not reached the measurement scheduled time (step S144; No), the processing returns to step S143. In a case where the current time has reached the measurement scheduled time (step S144; Yes), the processing proceeds to step S145.

In step S145, the control unit 21 functions as the measurement control unit 45 to control the blood pressure measurement unit 27 to measure the blood pressure of the user. The control unit 21 causes the blood pressure measurement unit 27 to measure the blood pressure of the user when the heart rate of the user exceeds the threshold within a time range ending at the measurement scheduled time, and causes the blood pressure measurement unit 27 to measure the blood pressure of the user at the measurement scheduled time in a case where the heart rate of the user has not exceeded the threshold within the time range.

In step S146, the control unit 21 determines whether the blood pressure has been measured after wake-up of the user. In a case where the blood pressure has not been measured after wake-up (step S146; No), in step S147, the control unit 21 functions as the measurement notification unit 46 to provide notification to prompt blood pressure measurement. Subsequently, the processing is ended. In a case where the blood pressure has been measured after wake-up (step S146; Yes), the processing is ended without notification.

According to the blood pressure monitor 120 having the configuration described above, the blood pressure can be measured at timing immediately before wake-up of the user when the blood pressure is predicted to be high. As a result, blood pressure changes before and after wake-up can be effectively observed.

Additionally, the predetermined time period used in calculating the measurement scheduled time may be determined by learning.

FIG. 15 schematically illustrates an example of a software configuration of a blood pressure monitor 150 according to an embodiment. In FIG. 15, elements similar to those illustrated in FIG. 4 are given the same reference numerals, and descriptions thereof will be omitted as appropriate. The blood pressure monitor 150 illustrated in FIG. 15 corresponds to the blood pressure monitor 11 illustrated in FIG. 4 supplemented with a determination unit 151. With respect to a hardware configuration, the blood pressure monitor 150 is similar to the blood pressure monitor 11.

Based on the measurement results obtained by measuring the blood pressure of the user at a time before the measurement scheduled time for a plurality of days, the determination unit 151 determines a time used in calculating the measurement scheduled time. For example, the blood pressure monitor 150 executes processing for measuring the blood pressure of the user at a time 10 minutes before the measurement scheduled time for a plurality of days, and determines the average value of blood pressure measurement values obtained by the processing. The average value is referred to as a first average value. The blood pressure measurement values are, for example, measurement values of systolic blood pressure. Subsequently, the blood pressure monitor 150 executes processing for measuring the blood pressure of the user at a time 15 minutes before the measurement scheduled time for a plurality of days, and determines the average value of blood pressure measurement values obtained by the processing. The average value is referred to as a second average value. Further subsequently, the blood pressure monitor 150 executes processing for measuring the blood pressure of the user at a time 20 minutes before the measurement scheduled time for a plurality of days, and determines the average value of blood pressure measurement values obtained by the processing. The average value is referred to as a third average value. The determination unit 151 compares the first average value, the second average value, and the third average value with one another, and determines the time corresponding to the highest average value to be the time used in calculating the measurement scheduled time. For example, in a case where the second average value is the largest, then the time used in calculating the measurement scheduled time is determined to be 15 minutes.

According to the blood pressure monitor 150 having the configuration described above, the blood pressure can be measured at timing immediately before wake-up of the user when the blood pressure is likely to be high. As a result, blood pressure changes before and after wake-up can be effectively observed.

Note that the present invention is not limited to the embodiments described above, and various modifications can be made in an implementation stage without departing from the gist. Furthermore, each of the embodiments may be implemented in combination as appropriate to the extent possible, and in this case, combined effects can be obtained. Also, the embodiments described above include various stages of invention, and various inventions may be extracted by appropriately combining the described plurality of disclosed constituent elements.

The part or whole of the embodiments described above can be described as, but not limited to, the following supplementary note.

Supplementary Note 1

A blood pressure measurement device (11) including:
a blood pressure measurement unit (27) configured to measure a blood pressure of a user,
a setting unit (44) configured to set a measurement scheduled time for a time
a predetermined time period before a wake-up scheduled time of the user, and
a measurement control unit (45) configured to cause the blood pressure measurement unit to measure the blood pressure of the user in accordance with the set measurement scheduled time.

REFERENCE NUMERALS LIST

10 Health management system
11 Blood pressure monitor
12 Smartphone
13 Server
14 Physician terminal
21 Control unit
211 CPU
212 RAM
213 Program memory
22 Storage device
23 Display device
24 Input device
25 Speaker
26 Communication interface
27 Blood pressure measurement unit
271 Pressing cuff
272 Pump
273 Pump drive circuit
274 Valve
275 Valve drive circuit
276 Pressure sensor
277 Oscillation circuit
278, 279 Tube
28 Body
41 Input unit
42 Display control unit
43 Communication control unit
44 Measurement scheduled time setting unit
45 Measurement control unit
46 Measurement notification unit 47 Measurement result storage unit
80 Blood pressure monitor
81 Acceleration sensor
91 Sleep detection unit
120 Blood pressure monitor
121 Heart rate sensor
131 Heart rate measurement control unit
150 Blood pressure monitor
151 Determination unit

The invention claimed is:

1. A blood pressure measurement device comprising:
a blood pressure monitor configured to measure a blood pressure of a user; and
a processor configured to:
set a measurement scheduled time for a time a predetermined time period before a wake-up scheduled time of the user;
detect a depth of sleep of the user based on an output of a sensor configured to detect a body motion of the user;
cause the blood pressure monitor to measure the blood pressure of the user when the detected depth of sleep is shallow within a time range ending at the set measurement scheduled time, and cause the blood pressure monitor to measure the blood pressure of the user at the set measurement scheduled time in a case where the detected depth of sleep is not shallow within the time range; and
determine the predetermined time period based on measurement results obtained by measuring the blood pressure of the user,
wherein the processor determines the predetermined time period by measuring for a plurality of days, for each of candidate time periods, the blood pressure of the user at a time of a candidate time period before the wake-up scheduled time to obtain blood pressure measurement values each being calculated from a pulse wave signal representing a variable component of arterial volume, determining, for each of the candidate time periods, an average of the blood pressure measurement values, and determining a candidate time period corresponding to a highest average of the blood pressure measurement values to be the predetermined time period,
wherein the blood pressure monitor includes a pressing cuff, a valve configured to selectively be in a closed state to prevent release of air from the pressing cuff or in an opened state to allow release of air from the pressing cuff, and a pump configured to supply air to the pressing cuff,
wherein the processor is configured to cause the blood pressure monitor to measure the blood pressure by causing the valve to be in the closed state and causing the pump to feed air into the pressing cuff before the blood pressure is measured, and once the blood pressure is measured, causing the pump to stop feeding air to the pressing cuff and causing the value to be in the opened state, and
wherein the blood pressure measurement values are systolic blood pressure or diastolic blood pressure.

2. A blood pressure measurement method performed by a blood pressure measurement device comprising a blood pressure monitor including a pressing cuff, a valve configured to selectively be in a closed state to prevent release of air from the pressing cuff or in an opened state to allow release of air from the pressing cuff, and a pump configured to supply air to the pressing cuff, the blood pressure monitor configured to measure a blood pressure of a user, the blood pressure measurement method comprising the steps of:
setting a measurement scheduled time for a time a predetermined time period before a wake-up scheduled time of the user;
detecting a depth of sleep of the user based on an output of a sensor configured to detect a body motion of the user;
causing the blood pressure monitor to measure the blood pressure of the user when the sleep is detected to be shallow within a time range ending at the set measurement scheduled time, and causing the blood pressure monitor to measure the blood pressure of the user at the set measurement scheduled time in a case where the sleep is not detected to be shallow within the time range; and
determining the predetermined time period based on measurement results obtained by measuring the blood pressure of the user,
wherein the determining of the predetermined time period comprises measuring for a plurality of days, for each of candidate time periods, the blood pressure of the user at a time of a candidate time period before the wake-up scheduled time to obtain blood pressure measurement values each being calculated from a pulse wave signal representing a variable component of arterial volume, determining, for each of the candidate time periods, an average of the blood pressure measurement values, and determining a candidate time period corresponding to a highest average of the blood pressure measurement values to be the predetermined time period,
wherein the causing of the blood pressure monitor to measure the blood pressure of the user comprises causing the valve to be in the closed state and causing the pump to feed air into the pressing cuff before the blood pressure is measured, and once the blood pressure is measured, causing the pump to stop feeding air to the pressing cuff and causing the value to be in the opened state, and
wherein the blood pressure measurement values are systolic blood pressure or diastolic blood pressure.

3. A blood pressure measurement device comprising:
a blood pressure monitor configured to measure a blood pressure of a user; and
a processor configured to:
set a measurement scheduled time for a time a predetermined time period before a wake-up scheduled time of the user;
cause the blood pressure monitor to measure the blood pressure of the user in accordance with the set measurement scheduled time;
determine the predetermined time period based on measurement results obtained by measuring the blood pressure of the user,
wherein the processor determines the predetermined time period by measuring for a plurality of days, for each of candidate time periods, the blood pressure of the user at a time of a candidate time period before the wake-up scheduled time to obtain blood pressure measurement values each being calculated from a pulse wave signal representing a variable component of arterial volume, determining, for each of the candidate time periods, an average of the blood pressure measurement values, and determining a candidate time period corresponding to a highest average of the blood pressure measurement values to be the predetermined time period, wherein the blood pressure monitor includes a pressing cuff, a valve configured to selectively be in a closed state to prevent release of air from the pressing cuff or in an opened state to allow release of air from the pressing cuff, and a pump configured to supply air to the pressing cuff, wherein the processor is configured to cause the blood pressure monitor to measure the blood pressure by causing the valve to be in the closed state and causing the pump to feed air into the pressing cuff before the blood pressure is measured, and once the blood pressure is measured, causing the pump to stop feeding air to the pressing cuff and causing the value to be in the opened state, and wherein the blood pressure measurement values are systolic blood pressure or diastolic blood pressure.

4. The blood pressure measurement device according to claim 1, wherein the processor sets the measurement scheduled time by using, as the wake-up scheduled time, an earliest alarm time of a plurality of preset alarm times when an alarm is output.

5. The blood pressure measurement device according to claim 1, wherein the processor sets the measurement scheduled time by using a wake-up time of the user for a preceding day as the wake-up scheduled time.

6. A blood pressure measurement method performed by a blood pressure measurement device comprising a blood pressure monitor including a pressing cuff, a valve configured to selectively be in a closed state to prevent release of air from the pressing cuff or in an opened state to allow release of air from the pressing cuff, and a pump configured to supply air to the pressing cuff, the blood pressure monitor configured to measure a blood pressure of a user, the blood pressure measurement method comprising the steps of:

setting a measurement scheduled time for a time a predetermined time period before a wake-up scheduled time of the user;

causing the blood pressure monitor to measure the blood pressure of the user in accordance with the set measurement scheduled time; and determining the predetermined time period based on measurement results obtained by measuring the blood pressure of the user, wherein the determining of the predetermined time period comprises measuring for a plurality of days, for each of candidate time periods, the blood pressure of the user at a time of a candidate time period before the wake-up scheduled time to obtain blood pressure measurement values each being calculated from a pulse wave signal representing a variable component of arterial volume, determining, for each of the candidate time periods, an average of the blood pressure measurement values, and determining a candidate time period corresponding to a highest average of the blood pressure measurement values to be the predetermined time period period, wherein the causing of the blood pressure monitor to measure the blood pressure of the user comprises causing the valve to be in the closed state and causing the pump to feed air into the pressing cuff before the blood pressure is measured, and once the blood pressure is measured, causing the pump to stop feeding air to the pressing cuff and causing the value to be in the opened state, and wherein the blood pressure measurement values are systolic blood pressure or diastolic blood pressure.

7. The blood pressure measurement device according to claim 3, wherein the processor sets the measurement scheduled time by using, as the wake-up scheduled time, an earliest alarm time of a plurality of preset alarm times when an alarm is output.

8. The blood pressure measurement device according to claim 3, wherein the processor sets the measurement scheduled time by using a wake-up time of the user for a preceding day as the wake-up scheduled time.

\* \* \* \* \*